(12) United States Patent
Sampath et al.

(10) Patent No.: US 12,407,622 B2
(45) Date of Patent: Sep. 2, 2025

(54) ESTIMATING A TIME TO RECOVER AN APPLICATION STACK FROM A PRIMARY REGION TO A STANDBY REGION

(71) Applicant: Oracle International Corporation, Redwood Shores, CA (US)

(72) Inventors: Praveen Sampath, Redwood City, CA (US); Rama Vijapurapu, Pleasanton, CA (US); Mahesh Desai, Cupertino, CA (US); Shekhar Borde, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 18/241,230

(22) Filed: Aug. 31, 2023

(65) Prior Publication Data
US 2025/0080475 A1  Mar. 6, 2025

(51) Int. Cl.
*H04L 47/74* (2022.01)
*H04L 47/70* (2022.01)
*H04L 47/80* (2022.01)

(52) U.S. Cl.
CPC .......... *H04L 47/746* (2013.01); *H04L 47/803* (2013.01); *H04L 47/826* (2013.01)

(58) Field of Classification Search
CPC ... H04L 47/826; H04L 47/746; H04L 47/803; H04L 47/782; G06F 9/5072; G06F 11/22; G06F 11/3419
See application file for complete search history.

(56) References Cited

U.S. PATENT DOCUMENTS

| | | | |
|---|---|---|---|
| 9,274,903 B1 | 3/2016 | Garlapati | |
| 9,971,664 B2 | 5/2018 | Raghunathan | |
| 11,210,009 B1 | 12/2021 | Freilich | |
| 2010/0058010 A1* | 3/2010 | Augenstein | G06F 11/1451 711/E12.103 |
| 2015/0032817 A1* | 1/2015 | Garg | G06F 11/2048 709/204 |
| 2015/0039930 A1* | 2/2015 | Babashetty | G06F 11/2221 714/4.11 |
| 2015/0317194 A1* | 11/2015 | Sampath | H04L 41/12 714/703 |
| 2015/0317220 A1* | 11/2015 | Sampath | H04L 41/145 714/4.11 |

(Continued)

OTHER PUBLICATIONS

Sampath, U.S. Appl. No. 18/241,228, filed Aug. 31, 2023, Non-Final Rejection, Dec. 10, 2024.

(Continued)

*Primary Examiner* — Chris Parry
*Assistant Examiner* — Hassan A Khan
(74) *Attorney, Agent, or Firm* — Hickman Becker Bingham Ledesma LLP

(57) ABSTRACT

Techniques for estimating a time to recover an application stack from a primary region to a standby region. In one technique, a recovery plan that comprises a plurality of actions to perform relative to a plurality of cloud resources in a recovery protection group is selected. Historical data that indicates actual times to perform one or more actions pertaining to recovering cloud resources is stored. Based on the historical data, a total time to execute the recovery plan is estimated. The total time is stored in association with the recovery plan.

20 Claims, 15 Drawing Sheets

(56) References Cited

U.S. PATENT DOCUMENTS

| | | | |
|---|---|---|---|
| 2015/0317221 A1* | 11/2015 | Sampath | H04L 41/00 |
| | | | 714/4.11 |
| 2015/0363282 A1 | 12/2015 | Rangasamy | |
| 2015/0379038 A1 | 12/2015 | Nikolov | |
| 2016/0048408 A1 | 2/2016 | Madhu | |
| 2017/0063615 A1* | 3/2017 | Yang | H04L 67/62 |
| 2017/0235950 A1* | 8/2017 | Gopalapura Venkatesh | |
| | | | G06F 16/176 |
| | | | 726/24 |
| 2017/0286517 A1 | 10/2017 | Horowitz | |
| 2018/0157563 A1* | 6/2018 | Bryant | G06F 11/2015 |
| 2018/0276041 A1* | 9/2018 | Bansal | G06F 11/30 |
| 2018/0365108 A1* | 12/2018 | Johnson | G06F 11/2033 |
| 2019/0095289 A1* | 3/2019 | Kumar | G06F 11/1451 |
| 2019/0095297 A1* | 3/2019 | Neall | G06F 11/2082 |
| 2019/0098037 A1* | 3/2019 | Shenoy, Jr. | H04L 63/1441 |
| 2020/0007620 A1 | 1/2020 | Das | |
| 2020/0026571 A1* | 1/2020 | Bahramshahry | G06F 9/5005 |
| 2020/0106782 A1* | 4/2020 | Sion | G06F 21/31 |
| 2020/0186432 A1 | 6/2020 | Owen | |
| 2020/0356452 A1* | 11/2020 | Shpilyuck | G06F 11/203 |
| 2020/0409815 A1* | 12/2020 | Gamliel | G06F 11/3447 |
| 2021/0091567 A1 | 3/2021 | Sunny | |
| 2021/0191629 A1* | 6/2021 | Vibhor | G06F 3/0659 |
| 2022/0012268 A1* | 1/2022 | Ghoshal | G06F 16/906 |
| 2022/0083245 A1* | 3/2022 | Kant | G06F 3/0688 |
| 2022/0147541 A1* | 5/2022 | Mallipeddi | G06F 3/065 |
| 2022/0188161 A1* | 6/2022 | Mohan | G06F 9/5038 |
| 2022/0239640 A1* | 7/2022 | Wang | H04L 63/0815 |
| 2022/0245036 A1* | 8/2022 | Azaria | G06F 9/45558 |
| 2023/0185683 A1* | 6/2023 | Asghar | G06F 11/203 |
| | | | 714/4.11 |
| 2024/0061751 A1 | 2/2024 | Janarthanam | |

OTHER PUBLICATIONS

Sampath, U.S. Appl. No. 18/241,228, filed Aug. 31, 2023, Final Rejection, Feb. 25, 2025.

Sampath, U.S. Appl. No. 18/241,224, filed Aug. 31, 2023, Non-Final Rejection, Mar. 3, 2025.

Gupta, "Exploring disaster recovery parameters in an enterprise application" International Conference On Innovaction and Challenges in Cyber Security (Iciccs-Inbush), Greater Noida, India, pp. 294-2999 (2016).

Al-Shammari, "Disaster Recovery and Business Continuity for Database Services in Mlti-Cloud" 1st International Conference On Computer Applications & Information Security (ICCAIS), Riyadh, Saudi Arabia, pp. 1-8 (2018).

Alhazmi, "Evaluating disaster recovery plans using the cloud" Proceedings Annual Reliability and Maintainability Symposium (RAMS), Orlando, FL USA, pp. 1-6 (2013).

* cited by examiner

300 switchover_template.json

```
1  [
2    {
3      "displayName": "BUILT_IN_PRECHECK",   310
4      "groupType": "BUILT_IN_PRECHECK"
5    },
6    {
7      "displayName": "COMPUTE_INSTANCE_STOP", 312
8      "groupType": "BUILT_IN"
9    },
10   {
11     "displayName": "VOLUME_GROUP_RESTORE_SWITCHOVER",  314
12     "groupType": "BUILT_IN"
13   },
14   {
15     "displayName": "DATABASE_SWITCHOVER",  316
16     "groupType": "BUILT_IN"
17   },
18   {
19     "displayName": "AUTONOMOUS_DATABASE_SWITCHOVER", 318
20     "groupType": "BUILT_IN"
21   },
22   {
23     "displayName": "COMPUTE_INSTANCE_LAUNCH", 322
24     "groupType": "BUILT_IN"
25   },
26   {
27     "displayName": "COMPUTE_INSTANCE_REMOVE", 324
28     "groupType": "BUILT_IN"
29   },
30   {
31     "displayName": "COMPUTE_INSTANCE_TERNINATE",  326
32     "groupType": "BUILT_IN"
33   },
34
```

FIG. 3A

Plan groups

| Name | Type | Enabled / Disabled |
|---|---|---|
| > Built-In Prechecks | Built-in precheck | Enabled |
| > USER_DEFINED_GROUP_PRIMARY | User defined | Enabled |
| > Update Primary Load Balancers' Backend Sets | Built-in | Enabled |
| > Stop Compute Instances | Built-in | Disabled |
| > Switchover Volume Groups | Built-in | Enabled |
| > Switchover Databases | Built-in | Enabled |
| > Switchover Autonomous Databases | Built-in | Enabled |
| > Switchover File Storage System | Built-in | Enabled |
| > Launch Compute Instances | Built-in | Enabled |
| > Remove Compute Instances From DR Protection Groups | Built-in | Disabled |
| > Terminate Compute Instances | Built-in | Enabled |
| > Reverse Volume Groups' Replication | Built-in | Enabled |
| > Remove Volume Groups From DR Protection Group | Built-in | Enabled |
| > Remove File Storage Systems From DR Protection Group | Built-in | Disabled |
| > Delete File Storage Systems | Built-in | Disabled |
| > Terminate Volume Groups | Built-in | Disabled |
| > Update Standby Load Balancers' Backend Sets | Built-in | Enabled |
| > USER_DEFINED_GROUP_PRIMARY | User defined | Enabled |
| > USER_DEFINED_GROUP_STANDBY | User defined | Enabled |
| > USER_GROUP1 | User defined | Enabled |

```
failover_templato.json
1   [
2     {
3       "displayName": "BUILT_IN_PRECHECK",    410
4       "groupType": "BUILT_IN_PRECHECK"
5     },
6     {
7       "displayName": "VOLUME_GROUP_RESTORE_FAILOVER",    412
8       "groupType": "BUILT_IN"
9     },
10    {
11      "displayName": "DATABASE_FAILOVER",    414
12      "groupType": "BUILT_IN"
13    },
14    {
15      "displayName": "AUTONOMOUS_DATABASE_FAILOVER",    416
16      "groupType": "BUILT_IN"
17    },
18    {
19      "displayName": "COMPUTE_INSTANCE_LAUNCH",    418
20      "groupType": "BUILT_IN"
21    }
22  ]
23
```

FIG. 4A

Plan groups

| Name | Type | Enabled / Disabled |
|---|---|---|
| > Built-In Prechecks | Built-in precheck | ● Enabled |
| > USER_DEFINED_GROUP_PRIMARY | User defined | ● Enabled |
| > Failover Volume Groups | Built-in | ● Enabled |
| > Failover Databases | Built-in | ● Enabled |
| > Failover Autonomous Databases | Built-in | ● Enabled |
| > Failover File Storage System | Built-in | ● Enabled |
| > Launch Compute Instances | Built-in | ● Enabled |
| > Update Standby Load Balancers' Backend Sets | Built-in | ● Enabled |
| > USER_DEFINED_GROUP_PRIMARY | User defined | ● Enabled |
| > USER_DEFINED_GROUP_STANDBY | User defined | ● Enabled |
| > USER_GROUP1 | User defined | ● Enabled |

```
   ┌─────────────────────────────────────────────────┐
   │          start_drill_template.json  x           │
 1 │ [                                               │
 2 │   {                                             │
 3 │     "displayName": "BUILT_IN_PRECHECK",  710    │
 4 │     "groupType": "BUILT_IN_PRECHECK"            │
 5 │   },                                            │
 6 │   {                                             │
 7 │     "displayName": "VOLUME_GROUP_RESTORE", 712  │
 8 │     "groupType": "BUILT_IN"                     │
 9 │   },                                            │
10 │   {                                             │
11 │     "displayName": "AUTONOMOUS_DATABASE_CREATE_CLONE", 714 │
12 │     "groupType": "BUILT_IN"                     │
13 │   },                                            │
14 │   {                                             │
15 │     "displayName": "COMPUTE_INSTANCE_LAUNCH", 716 │
16 │     "groupType": "BUILT_IN"                     │
17 │   }                                             │
18 │ ]                                               │
19 │                                                 │
```

FIG. 7A

Plan groups

| Name | Type | Enabled / Disabled |
|---|---|---|
| > Built-In Prechecks | Built-in precheck | ● Enabled |
| > USER_DEFINED_GROUP_PRIMARY | User defined | ● Enabled |
| > Restore For Drill Volume Groups | Built-in | ● Enabled |
| > Create Refreshable Clone For Autonomous Database | Built-in | ● Enabled |
| > Restore For Drill File Storage System | Built-in | ● Enabled |
| > Launch Compute Instances | Built-in | ● Enabled |
| > Update Standby Load Balancers' Backend Sets | User defined | ● Enabled |
| > USER_DEFINED_GROUP_PRIMARY | User defined | ● Enabled |
| > USER_DEFINED_GROUP_STANDBY | User defined | ● Enabled |
| > USER_GROUP1 | User defined | ● Enabled |

*FIG. 7B*

```json
[
    {
        "displayName": "BUILT_IN_PRECHECK",
        "groupType": "BUILT_IN_PRECHECK"
    },
    {
        "displayName": "COMPUTE_INSTANCE_STOP",
        "groupType": "BUILT_IN"
    },
    {
        "displayName": "COMPUTE_INSTANCE_REMOVE",
        "groupType": "BUILT_IN"
    },
    {
        "displayName": "COMPUTE_INSTANCE_TERMINATE",
        "groupType": "BUILT_IN"
    },
    {
        "displayName": "AUTONOMOUS_DATABASE_DELETE_CLONE",
        "groupType": "BUILT_IN"
    },
    {
        "displayName": "VOLUME_GROUP_REMOVE",
        "groupType": "BUILT_IN"
    },
    {
        "displayName": "VOLUME_GROUP_TERMINATE",
        "groupType": "BUILT_IN"
    }
]
```

FIG. 8

ESTIMATING A TIME TO RECOVER AN APPLICATION STACK FROM A PRIMARY REGION TO A STANDBY REGION

RELATED APPLICATION

This application is related to application Ser. No. 18/241,224, filed Aug. 31, 2023, entitled RECOVERING AN APPLICATION STACK FROM A PRIMARY REGION TO A STANDBY REGION USING A RECOVERY PROTECTION GROUP and application Ser. No. 18/241,228, filed Aug. 31, 2023, entitled PERFORMING A RECOVERY DRILL FOR AN APPLICATION STACK USING A RECOVERY PROTECTION GROUP, the contents of each of which are incorporated by reference as if fully disclosed herein.

TECHNICAL FIELD

The present disclosure relates to cloud resources in an application stack and, more particularly, to recovering cloud resources in a standby region in case of a planned or unplanned outage in a primary region.

BACKGROUND

Enterprises are increasingly moving their applications from their local premises to the cloud where cloud providers provide the hardware and software to support those applications. Cloud systems tend to be more stable than on-premise systems. Nevertheless, cloud systems may become inaccessible from time to time. Some cloud providers offer services to assist enterprises in moving their applications (and cloud resources that support those applications) from one cloud (or cloud region) to another, both provided by the same cloud provider.

However, in case of a disaster event where an enterprise application in a primary cloud region becomes unavailable, it is currently very difficult and time consuming to identify all resources pertaining to the enterprise application and then to perform an orchestrated recovery process in order to bring the enterprise application up and running in another cloud region that is available.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3A is a screenshot of an example switchover template, in an embodiment;

FIG. 3B is a screenshot of an example user interface that displays steps of a switchover recovery plan, in an embodiment;

FIG. 4A is a screenshot of an example failover template, in an embodiment;

FIG. 4B is a screenshot of an example user interface for presenting steps of a failover recovery plan, in an embodiment;

FIG. 7A is a screenshot of an example switchover template, in an embodiment;

FIG. 7B is a screenshot of an example user interface for presenting steps of a start drill plan, in an embodiment;

FIG. 8 is a screenshot of an example failover template, in an embodiment;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A method and system are described for modeling a set of cloud resources and recovering the set of cloud resources (originally established in a primary region) in a standby region. A user or owner of the set of cloud resources (pertaining to the user's application stack) selects the set of cloud resources to be identified a "recovery protection group." A cloud recovery service treats the recovery protection group as a single unit, analyzes each cloud resource indicated in the group, automatically generates (based on a result of the analysis) a recovery plan in case of a failover scenario or a switchover scenario, and executes the recovery plan when a recovery operation is triggered with respect to the recovery protection group.

Embodiments improve computer-related technology involving the recovery of cloud resources. Embodiments involving auto-generated recovery plans allow such recovery to occur with minimal user intervention, if any, which speeds up the time to recover while reducing (or eliminating) errors resulting from user intervention. Also, a "recovery protection group" is a new infrastructure cloud resource that assists a cloud recovery service in performing deep introspection and generating recovery plans.

Embodiments also allow for a simulated recovery (or "drill") to take place before an actual recovery scenario occurs. In this way, any negative issues or problems that arise during the drill may be addressed and corrected before an actual recovery is attempted.

Embodiments also enable the generation of relatively accurate recovery time estimates. Such recovery time estimates are based on historical recovery scenarios involving the same or similar recovery protection groups. Such accurate recovery time estimates allow users or owners of recovery protection groups to plan for future recovery scenarios and possibly update current cloud resource provisioning. For example, a user may decide to increase the number of compute instances allocated to an application stack or decrease the amount of storage allocated to the application stack.

System Overview

Figure 1:
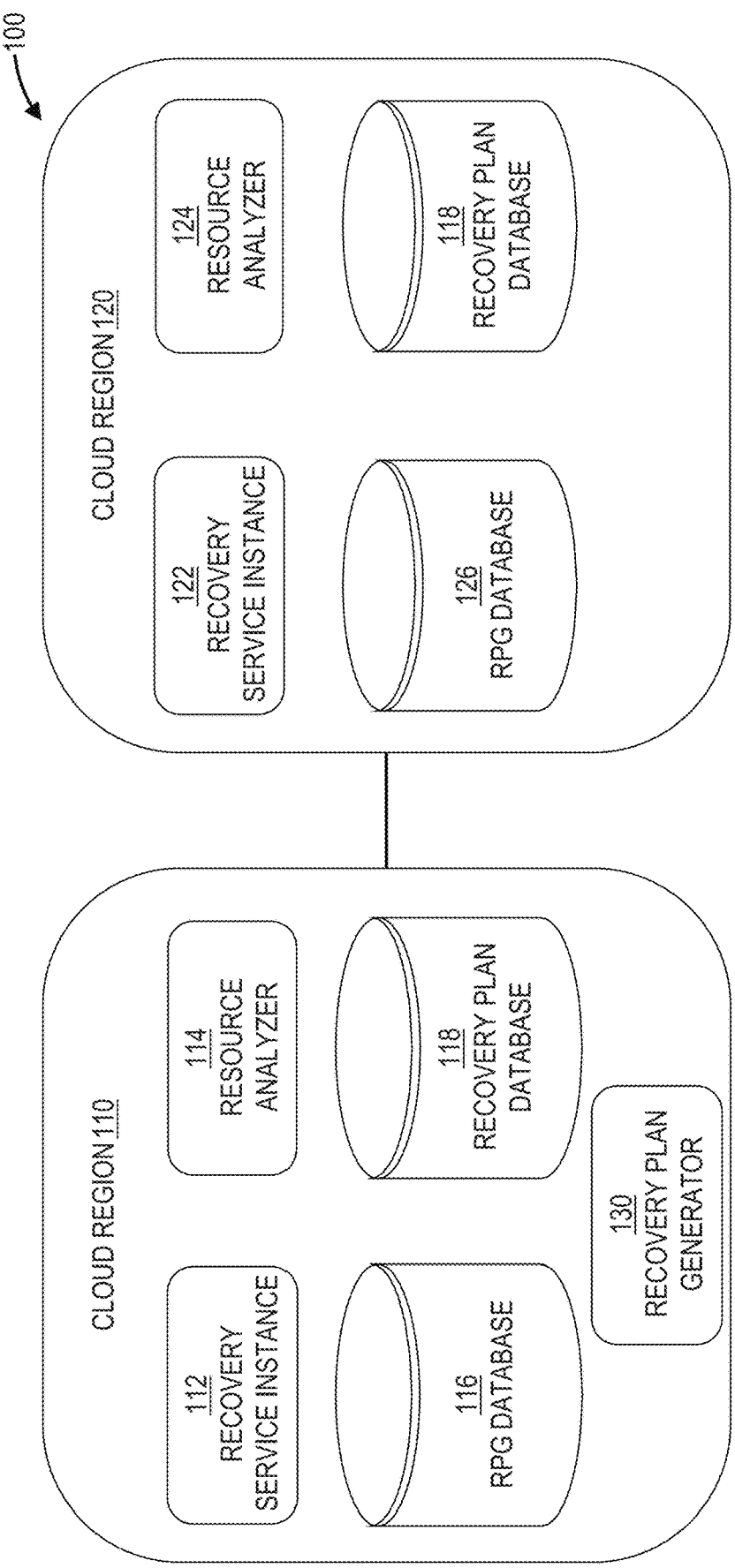
FIG. 1 is a block diagram that depicts an example cloud system, in an embodiment.

FIG. 1 is a block diagram that depicts an example cloud system 100, in an embodiment. A cloud provider provides cloud system 100. The cloud provider may be an organization, such as an enterprise, that provides cloud services to one or more entities, such as users or organizations (or "customers") that desire to host their applications in the cloud. Thus, cloud system 100 hosts applications on behalf of users or organizations that originate those applications.

An "application stack" comprises an application and a set of cloud-provided resources that support the application. The cloud provider may also provide the application. Examples of cloud-provided resources include database resources, compute resources, storage resources, and networking resources. A customer of cloud system 100 (or of the cloud provider) owns or manages one or more application stacks. In other words, each application stack is associated with a customer of cloud system 100.

Cloud system 100 includes regions 110 and 120 and an instance (112, 122) of a recovery service in each region. Although only two regions are depicted, cloud system 100 may comprise more than two regions. A region may be a primary region with respect to one application stack and a standby region with respect to another application stack. Region 110 includes cloud recovery service instance 112 and region 120 includes recovery service instance 122. Recovery service instances 112 and 122 may be implemented in software, hardware, or any combination of hardware and software.

Each region comprises a set of computing devices (such as a data center) that host applications along with cloud-provided (e.g., platform and/or infrastructure) resources that support the applications. Different regions may be located in different cities. Cloud system 100 allows end-users (e.g., customers of a customer of cloud system 100) to connect to the applications, which, in turn, relies on one or more of the cloud-provided resources in order to provide one or more application-related services to the end-users.

Each customer of cloud system 100 provides input that specifies which cloud-provided resources are requested to run and/or support an application. Cloud system 100 may provide a user interface to such customers that allows the customers to make those selections. The input may specify not only the type of cloud-provided resources, but also the quantity and sub-type. For example, a customer may select a certain type of database from among multiple database type options and a number of databases of the selected type. The customer may also select a number of compute instances and a number of central processing units (CPUs) for each compute instance. (Compute instances are also referred to as "compute nodes.") The customer may also select a type of storage (e.g., block storage, object storage, or file storage) and an amount of that type of storage, such as two terabytes. (Block storage refers to any type of storage that uses block devices (or disks), as opposed to file storage. In file storage, a user uses the filesystem and files directly without requiring any knowledge of the underlying storage used to store the files.) Examples of other items that a customer may select include traffic load balancers, secure vaults, networking components, and security configurations, including parameters or characteristics thereof.

While an application stack is "active" or up and running (e.g., servicing requests from end-users of the application of the application stack), a customer/owner of the application stack may modify parameters or characteristics of the application stack. For example, the customer may add a database, remove a compute instance, and/or modify a storage type. These modifications may be performed while the application stack is active.

One distinction between a database resource and a storage resource is that a database resource typically stores critical data while a storage resource typically does not. The definition of what is critical to an enterprise is different from enterprise to enterprise or organization to organization. Nevertheless, an example of data that is often treated as non-critical is application log files. Non-critical data may be stored locally (e.g., by a compute instance that hosts an application) before being transmitted to a storage resource, whether periodically or on demand. Critical data, on the other hand, is data that cannot be lost. Cloud database resources may be designed to ensure the integrity of data by maintaining atomicity, consistency, isolation, and durability (i.e., ACID properties).

Some application stacks may comprise multiple individual storage disks, which are also referred to as "volumes" or block storage units. A set of individual storage disks for an application stack is referred to as a "volume group." A volume group may be treated together for consistency purposes. There may be multiple types of volumes, such as a boot volume and a block volume. Different types of volumes may be in the same volume group.

Recovery Protection Group

A recovery protection group (RPG) is a set of cloud resources in an application stack of a customer. In an embodiment, a customer selects the set of cloud resources to include in an RPG. Thus, an RPG may include less than all resources in the corresponding application stack.

An RPG may be implemented as a data structure that includes a reference or identification data for each of one or more cloud resources (of a single customer) that reside in a primary region. The data structure is stored in one or more of RPG databases 116 and 126. Each RPG may have a corresponding entry in one or more of RPG databases 116 and 126. Copies of an RPG may reside in both a primary region and a standby region. RPG databases 116 and 126 store detailed recovery data for each resource in each RPG and details (e.g., steps and step configurations) for each recovery plan generated/created for each RPG.

For example, each reference, in an RPG, to a cloud resource may include a unique cloud identifier, region location data that indicates a region in which the cloud resource resides, a location of the cloud resource in that region, internal data and properties about the cloud resource that can be used to reconstitute/rebuild the cloud resource in another region, optional user-provided properties for the cloud resource that can be used to reconstitute/rebuild the cloud resource in another region. An RPG allows all resources indicated in the RPG to be treated similarly at the same time, i.e., during a recovery operation.

In a related embodiment, a recovery service instance (e.g., instance 112) automatically identifies cloud resources of a customer and creates an RPG for the identified cloud resources. For example, a customer specifies an application and the recovery service instance identifies all cloud resources upon which the application depends or calls. As another example, the recovery service instance identifies a provisioning document that lists all platform resources (e.g., databases) and infrastructure resources (e.g., compute instances and storage) that a customer has requested to be provisioned for an application of the customer. The recovery service instance includes, in an RPG, references to those cloud-provided resources in addition to the application.

An RPG may indicate which region is a primary region for the cloud resources in the RPG and which region is a standby region for those cloud resources. In an embodiment, an RPG identifies multiple standby regions. For example, a primary region of an RPG may be in Phoenix, Arizona, while standby regions of the RPG may be in Austin, Texas and London, England. Then, if the data center in Phoenix becomes unavailable and the data center in Austin happens to be unavailable at the same time, then the cloud resources of the RPG may be recovered (using embodiments described herein) in the data center in London.

In an embodiment, after creation of an RPG, a recovery service instance analyzes the cloud resources indicated in the RPG and determines whether one or more cloud resources might be missing. For example, a recovery service instance may be configured to know that certain types of applications (e.g., an EBS (E-Business Suite) application) rely on or require a database. Then, when analyzing an RPG, the recovery service instance determines that (i) an application indicated in an RPG is of one of those certain types and (ii) the RPG does not indicate a database. In this scenario, the recovery service instance sends and/or displays, to a customer, a notification (e.g., a popup message, text message, or email message) that notifies the customer about the allegedly missing database and prompts the customer to add, to the RPG, a reference to the database. On the other hand, if the recovery service instance determines that one or more types of cloud resources are missing from an RPG but does not know much (or anything) about the application, then the recovery service instance may still send a notification to the customer where the notification prompts the customer about whether there are any more cloud resources to add to the RPG. The notification may identify the one or more (e.g., typical) types of cloud resources that are missing.

A customer may modify an RPG after the creation of the RPG. For example, a customer may: (a) add, to an existing RPG, references to cloud resources; (b) remove, from the RPG, references to cloud resources; and/or (c) modify characteristics of cloud resources already assigned to the RPG. For example, an existing cloud resource indicated in an RPG is a database and the modification is that a change in size of the database or a change in type of database (e.g., autonomous to non-autonomous or relational to object-relational).

In a related embodiment, an RPG includes application identification data that identifies one or more applications or application artifacts from an application stack. An application artifact is either an application or a complex data object that is created by an end-user without the need to know a general programming language. Examples of applications include an Oracle fusion middleware application, an Oracle Peoplesoft application, a Weblogic application, a service-oriented architecture (SOA) application, Oracle E-Business Suite (EBS), Oracle JD Edwards Enterprise (JDE), etc. A customer may select an application and/or application artifact in an application stack to include in an RPG along with cloud-provided resources. In this way, a recovery workflow can include all components that a customer desires to be recovered in a recovery operation. A recovery operation can then recover cloud-provided resources before recovering the application that relies on those cloud-provided resources.

Some customers may have multiple applications (e.g., an HR application and a payroll application) that run on cloud system 100 and that rely on cloud-provided resources. In an embodiment, a customer with multiple applications selects the multiple applications to be included in the same RPG. However, a downside to this approach is that a recovery plan to recover the entire RPG becomes more complex and there is a greater likelihood that an error might happen with respect to one application or cloud-provided resource for the application in the RPG. An error that might result from recovering one application might prevent the success of recovering all other resources in the RPG. In other words, the resources in an RPG are interdependent on each other successfully recovering. Thus, in another embodiment, a customer provides input that selects that each application (or application stack) be included in a different RPG or that one application be included in one RPG and two or more other applications be included in another RPG. Thus, different RPGs will have different recovery plans (described in more detail herein). Also, different RPGs may be associated with different types of recovery operations (e.g., switchover or failover). In a related embodiment, different elements or components of an application stack are in different RPGs, based on input specified by the customer or automatically by the cloud provider.

Deep Introspection

In an embodiment, cloud system 100 includes one or more analyzers 114, 124 that analyze cloud resources indicated in a recovery protection group (RPG) to identify characteristics of those cloud resources. Analyzer 114 executes in region 110 while analyzer 124 executes in region 120. Thus, analyzer 114 analyzes RPGs (indicated in RPG database 116) that identify region 110 as a primary region while analyzer 124 analyzes RPGs (indicated in RPG database 126) that identify region 120 as a primary region. Thus, analyzer 114 may ignore RPGs that identify region 120 as their primary region and analyzer 124 may ignore RPGs that identify region 110 as their primary region.

Analyzers 114 and 124 may be, respectively, part of recovery service instances 112 and 122 or may be implemented separately therefrom. Analyzers 114 and 124 may be implemented in software, hardware, or any combination of hardware and software. Thus, for example, recovery service instance 112 identifies an RPG whose primary region is region 110, determines that the RPG includes a database resource, and calls analyzer 114 to identify characteristics of the database resource. Example characteristics that analyzers 114 and 124 identify include, for each cloud resource indicated in an RPG, a location of the cloud resource in cloud system 100, a type of the cloud resource (e.g., application, database, compute instance, storage), a sub-type of the cloud resource (e.g., block storage or a particular type of database), (for block storage) how many block devices (or disks) to which the storage is connected, how much memory has been allocated to the cloud resource (e.g., in megabytes), how much memory the cloud resource is currently using, (for each compute instance) how many CPUs is the compute instance using, and a communication protocol to use when communicating with the cloud resource. Additional information that analyzer 114 may gather include networking dependencies and a configuration for a compute instance, security configuration, replication or backup configuration for volume groups, replication configuration for file systems, data guard configuration for databases, and load balancer configurations.

In a related embodiment, each of analyzers 114 and 124 is implemented as a set of plug-ins, where each plug-in is configured to analyze a different resource type, such as application, database, compute instance, storage, network, file storage service, and load balancer. For example, one plug-in may be used to analyze databases indicated in RPGs while another plug-in may be used to analyze compute instances indicated in RPGs. Thus, each plug-in acts as a domain-specific expert. In the multiple plug-in embodiment, each of recovery service instances 112 and 122 includes a main component that communicates with each plug-in, retrieves the data/characteristics from each plug-in, and constructs or generates a recovery workflow, embodied in a recovery plan.

Analyzers 114 and 124 may store identified characteristics of cloud resources in, respectively, RPG databases 116 and 126. These characteristics are used to generate (e.g., by recovery service instances 112, 122) recovery plans, as described in detail below.

Recovery Plans

A recovery plan is a set of steps or actions that a recovery process executes in order to perform a recovery operation with respect to cloud resources indicated in an RPG. Each step or action comprises a script (e.g., JavaScript) or code (e.g., Java or Python) that is executed in a particular order when the recovery plan is executed.

Example recovery operations include a failover operation and a switchover operation. (A drill operation, while not technically for recovery, is a similar operation that is described in more detail herein and is performed using a recovery plan.) A switchover operation involves bringing down (or deallocating) cloud resources indicated in an RPG in an orderly manner in a primary region and bringing up (or allocating) those cloud resources in a standby region. A failover operation is triggered when an application in its primary region becomes unresponsive or when the entire primary region becomes unresponsive. Thus, no orderly bringing down of the cloud resources indicated in an RPG in the primary region is necessary. For example, the primary region may experience an outage, such as a blackout. Thus, a failover operation involves activating the cloud resources in a standby region.

A step of a recovery plan may be associated with zero or more attributes (or flags), examples of which include a timeout attribute, an optional attribute, a notification attribute, and an enable/disable attribute. If a step has a timeout attribute, then the timeout attribute is associated with or indicates a threshold time. If, during execution of the step, the time to execute the step exceeds the threshold time, then the step is terminated. This prevents "runaway" steps from consuming unnecessary computing resources. If a step has an optional attribute, then, if the step fails, the recovery plan continues to the next step (or continues executing any concurrent steps). If a step does not have an optional attribute, then, if the step fails, the entire recovery plan fails and no more steps of the recovery plan are executed. If a step has a notification attribute, then a recovery service instance that is executing the step generates and sends a notification about the final status of the step, such as whether the step failed, succeeded, or timed out. If a step has an enable attribute or disable attribute in a recovery plan, then the execution of step is either enabled or disabled in that recovery plan. These attributes may be available to both built-in steps (i.e., automatically-generated steps) and custom steps.

Some attributes may be default attributes for some or all steps. For example, each step may have a notification attribute by default, a timeout attribute by default, but not an optional attribute by default.

In an embodiment, a recovery plan is generated based not only on characteristics of cloud resources indicated in an RPG but also based on a recovery plan template. A recovery plan template is useful because a template ensures that some steps or actions to execute in order to perform a recovery operation should be performed. A template may also ensure that certain steps are performed in a particular order or sequence. For example, a database in a primary region cannot be switched over before the corresponding application in the primary region is stopped, which application might be still writing to the database. Similarly, a compute instance should not be stopped until the application is stopped. Nevertheless, a customer may change a template, such as adding steps, removing steps, or changing the order of steps.

In an embodiment, different types of recovery operations are associated with different recovery templates. For example, there may be a switchover template for a switchover operation and a failover template for a failover operation. Again, each template may specify an order in which certain actions are performed. For example, template A indicates that actions 2 and 3 are to be performed after action 1 completes, while template B indicates that action 8 precedes action 9, which precedes actions 10 and 11.

A recovery plan generator 130 generates a recovery plan for cloud resources indicated in an RPG based on characteristics (of those cloud resources) indicated in an entry for the RPG in the RPG database 116. (Additionally or alternatively, an instance of recovery plan generator 130 executes in standby region 120 and has access to RPG database 126.) Recovery plan generator 130 may use the characteristics of resources indicated in an RPG to fill in or populate a recovery template. For example, a step or action in a recovery template may require numerous characteristics of a cloud resource including, but not limited to, name, unique identifier, location, behavioral and functional attributes, data about relations to other resources inside and outside the RPG, and any other data pertinent to recovery of that resource. Recovery plan generator 130 identifies the particular type indicated in the action of the recovery template, searches an entry in RPG database 116 for a cloud resource that is of the particular type, retrieves the name, identifier, and pertinent recovery data for that cloud resource from the entry, and inserts the location and name, identifier, and pertinent recovery data in a portion of that action in the recovery template, which becomes part of the resulting recovery plan.

In a related embodiment that does not involve templates, recovery plan generator 130 includes code that, when executed, ensures that certain steps are considered and that certain sets of steps are performed in a particular order, depending on the type of recovery operation.

Upon automatic generation of a recovery plan, recovery plan generator 130 may store the recovery plan in one or more of recovery plan databases 118 and 128, which are accessible, respectively, to recovery service instances 112 and 122.

Some of the cloud resources of the application stack may have already been allocated in the standby region before the application stack in the primary region became unresponsive. For example, a standby database is operating in the standby region while the application is active in the primary region. During operation of the application stack in the primary region, a primary database (in the application stack) is causing redo logs to be sent to the standby database, which persistently stores the redo logs (and, optionally, applies them to data in the standby database). Thus, the standby database has up-to-date data that a future recovered application in the standby region will access to process client requests. While the application stack in the primary region is active, a version of the application in the standby region is not necessary. However, a customer may wish to have some cloud resources for an application stack already allocated for the application to start as soon as possible in case of a failover or switchover operation.

Figure 2:
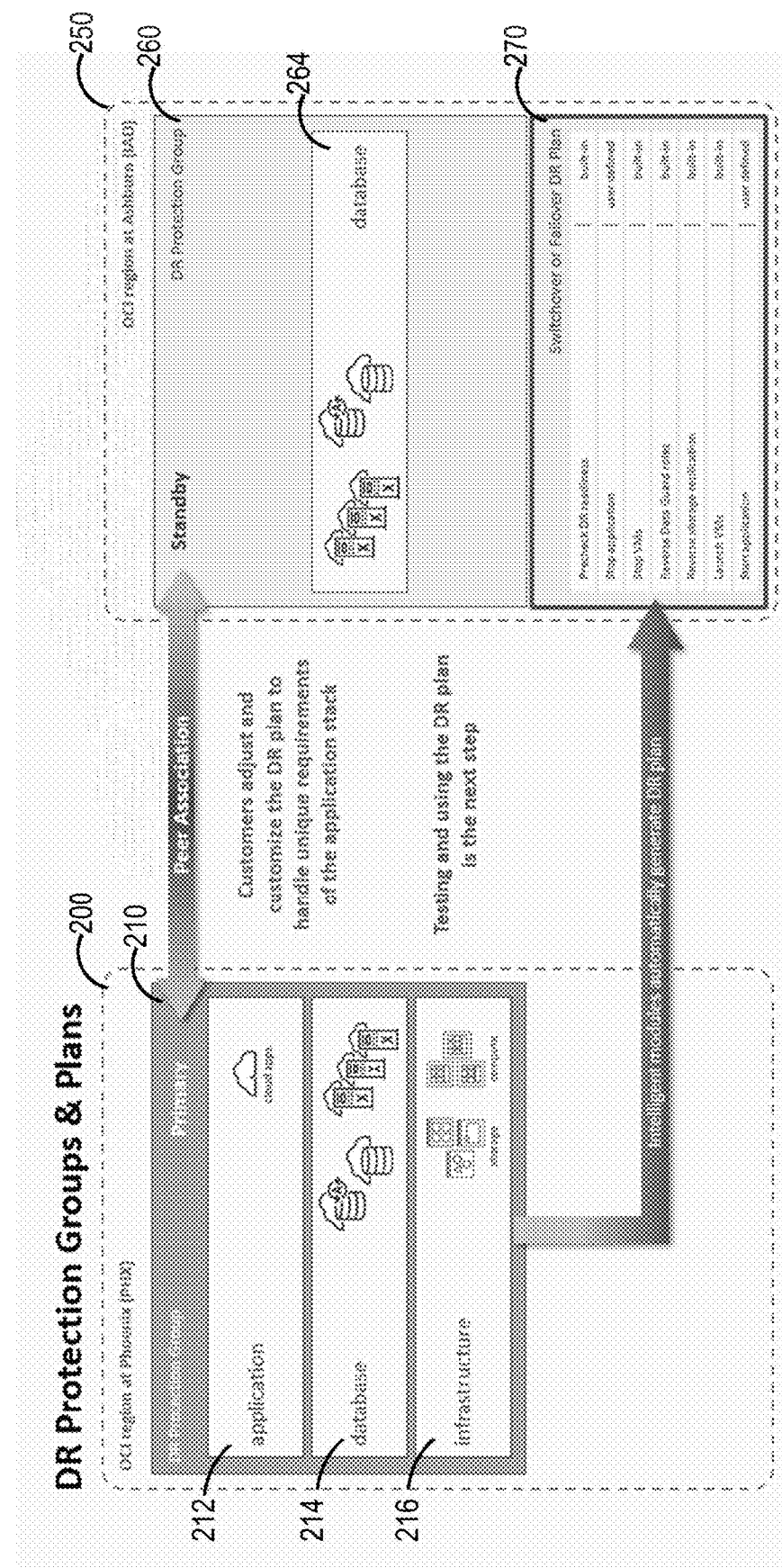
FIG. 2 is a block diagram that depicts two cloud regions and corresponding RPGs, in an embodiment.

FIG. 2 is a block diagram that depicts two cloud regions 200, 250 and RPGs 210, 260, in an embodiment. Cloud region 200 is a primary region for an RPG 210, which is associated with RPG 260 in standby region 250. Each of RPGs 210 and 260 may include the same RPG identifier, which is used by recovery service instances in both cloud regions to determine that RPGs 210 and 260 are associated with each other.

RPG 210 comprises an application 212, a database resource set 214 (comprising multiple databases), and infrastructure resources 216, which comprises storage resources and compute resources. RPG 260 comprises a database resource set 264, which corresponds to database resource set 214. For example, transactions that are initiated in database resource set 214 are sent to database resource set 264 and are not considered complete until database resource set 264 confirms persistent storage of redo logs that reflect the transactions. Recovery plan generator 130 (not depicted in FIG. 2) generates a recovery plan 270 and causes recovery plan 270 to be stored in standby region 250, ready to be executed when a recovery operation pertaining to that plan is initiated or triggered. Recovery plan 270 comprises a series of steps, some of which are built-in steps and some of which are custom created.

Example steps in a switchover recovery plan include (in the primary region) bringing down or stopping a load balancer so that no more client requests are received for an application, stopping the application, stopping one or more compute instances in the application stack, stopping one or more databases in the application stack, and stopping one or more storage resources in the application stack. Examples steps in a switchover recovery plan and a failover recovery plan include allocating one or more storage resources, allocating one or more databases, allocating one or more compute instances, bringing up or starting the application on the one or more compute instances, and starting a load balancer, all in the standby region.

FIG. 3A is a screenshot of an example switchover template 300, in an embodiment. Template 300 includes eight steps: a built-in pre-check step 310 (described in more detail herein), a stop compute instance step 312 (which stops one or more compute instances in a primary region of an RPG and effectively stops the application in the primary region from executing), a volume group switchover step 314 (which makes an existing volume, or set of storage disks, on a standby region of the RPG an active volume and makes the existing volume on the primary region an inactive or standby volume), a database switchover step 316 (which makes (i) an existing standby database an active database and (ii) an active database a standby database), an autonomous database switchover step 318 (which is similar to database switchover 316 except for a different type of database), a launch compute instance step 322 (which launches one or more compute instances in the standby region, and may involve attaching those compute instances to an application in the standby region), a remove compute instance step 324 (which removes, or detaches, one or more compute instances in the primary region from the application in the primary region), and a terminate compute instance step 326 (which terminates the one or more compute instances in the primary region). In this example, each of the steps is a built-in step. The code to implement these steps (e.g., Java code) found in this template may be in another file and that code examines the template and performs the step executions. However, some steps may be custom steps that are defined by a user or customer.

In an RPG, a volume group may be designated as dependent on one or more compute instances. Then, during a switchover recovery operation, one or more new compute instances are brought up (or instantiated) in the standby region, a new volume group is created in the standby region, the new volume group is attached to the new compute instances, and the old compute instances and the old volume group are terminated.

FIG. 3B is a screenshot of an example user interface (UI) 350 that displays steps of a switchover recovery plan, in an embodiment. UI 350 comprises three columns: a name column that indicates a name of a step in the switchover recovery plan, a type column that indicates a type of that step (whether built-in or user defined), and an enabled/disabled column that indicates whether that step is enabled or disabled. User selection of a name of a step may cause one or more sub-steps of that step (and/or one or more details of the step) to be presented in UI 350. In this example, four steps in the switchover recovery plan are disabled and four others are user defined.

FIG. 4A is a screenshot of an example failover template 400, in an embodiment. Template 400 includes five steps: a built-in pre-check step 410 (described in more detail herein), a volume group restore failover step 412 (which makes an existing volume, or set of storage disks, on a standby region of the RPG an active volume and makes the existing volume on the primary region an inactive or standby volume), a database failover step 414 (which makes (i) an existing standby database an active database and (ii) an active database a standby database), an autonomous database failover step 416 (which is similar to database failover 314 except for a different type of database), and a launch compute instance step 418 (which launches one or more compute instances in the standby region, and may involve attaching those compute instances to an application in the standby region). In this example, each of the steps is a built-in step.

Some steps or actions in a recovery template may indicate that such steps/actions may be repeated if there are multiple cloud resources of a particular type. For example, an RPG may include multiple databases. Thus, recovery plan generator 130 makes multiple copies of a stop_database action (one for each of the databases), retrieves characteristics of the databases from an entry in RPG database 116, and inserts the retrieved characteristics in the copies of that action. The updated copies become part of the resulting recovery plan.

In an embodiment, two or more steps in a recovery plan may be performed in parallel. Thus, a recovery plan may indicate (i) which steps must wait to begin execution until a previous step completes and (ii) which steps may be performed in parallel or concurrently with each other. For example, one or more databases in an RPG may be stopped at the same time one or more storage resources in the RPG are stopped. Thus, two or more steps may be performed in parallel. However, a subsequent step may only require one of those parallel steps to complete before the subsequent step begins execution.

In an embodiment, a customer customizes a recovery plan that recovery plan generator 130 automatically generated for an RPG of the customer. Such customization may involve adding one or more steps to the recovery plan, deleting one or more steps from the recovery plan, reordering one or more steps in the recovery plan, and/or modifying one or more steps in the recovery plan. User-defined steps may be customized similar to built-in steps. For example, a user may set the step timeout, make them optional (e.g., stop on error vs. continue on error), and enable/disable the step.

FIG. 4B is a screenshot of an example user interface (UI) 450 for presenting steps of a failover recovery plan, in an embodiment. UI 450 comprises three columns: a name column that indicates a name of a step in the failover recovery plan, a type column that indicates a type of that step (whether built-in or user defined), and an enabled/disabled column that indicates whether that step is enabled or disabled. User selection of a name of a step may cause one or more sub-steps of that step (and/or one or more details of the step) to be presented in UI 450. In this example, no steps in the switchover recovery plan are disabled and four steps are user defined.

Example Recovery Plan Generation Process

Figure 5:
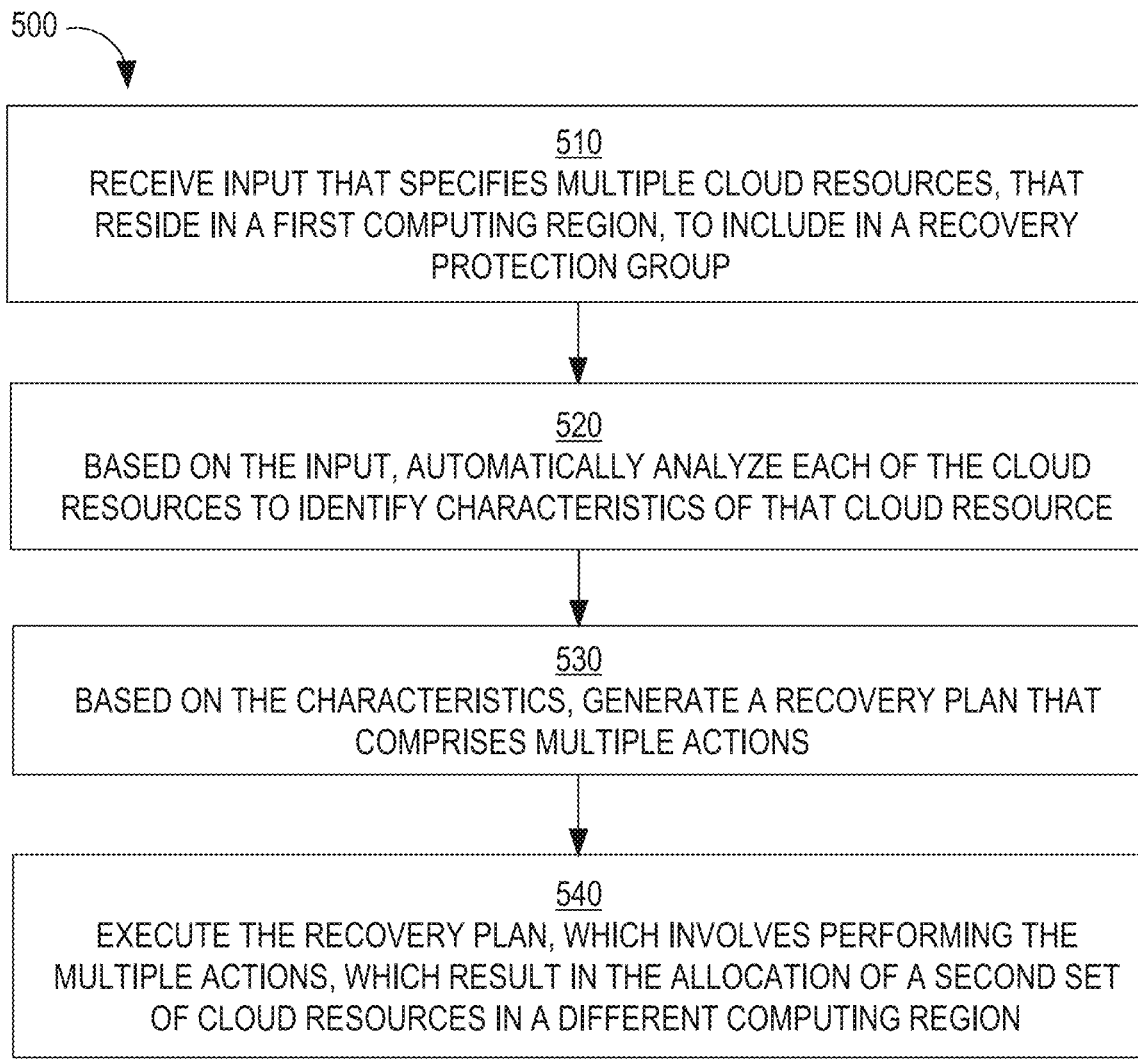
FIG. 5 is a flow diagram that depicts an example process for automatically generating a recovery plan, in an embodiment.

FIG. 5 is a flow diagram that depicts an example process 500 for automatically generating a recovery plan, in an embodiment. Process 500 may be performed by one or more components of cloud system 100, such as analyzer 114 and recovery plan generator 130.

At block 510, input is received that specifies multiple cloud resources, that reside in a first computing region, to include in a recovery protection group. Block 510 may involve displaying a user interface to a customer and receiving, through the user interface, input that identifies an application and one or more cloud resources upon which the application relies, such as one or more compute instances, storage, and/or one or more databases. The user interface may also include an option to select a type of recovery operation, such as a failover operation or a switchover operation, or both.

At block 520, based on the input, each of the cloud resources is automatically analyzed to identify characteristics of that cloud resource. Block 520 may be performed by different plug-ins of analyzer 114. Block 520 may involve using a cloud resource identifier that is provided by the customer (or that is based on data provided by the customer) to look up a configuration file for the cloud resource, the configuration file indicating characteristics of the cloud resource.

At block 530, based on the characteristics, a recovery plan that comprises multiple actions is generated. Block 530 may involve selecting a recovery template from among multiple recovery templates, depending on the type of recovery operation that is requested. The recovery template includes pre-defined steps or actions, each for a different resource or type of resource. Thus, one action may be for taking down an application and another action may be for bringing up the application in another cloud region.

At block 540, the recovery plan is executed. Executing the recovery plan involves performing the multiple actions, which results in allocation of a second set of cloud resources in a second computing region that is different than the first computing region. Block 540 may involve performing a pre-check, which is described in more detail herein.

Recovery Plan Execution

A recovery plan may be triggered in one of multiple ways, such as automatically or manually through input from a customer. For example, a recovery plan is triggered automatically in response to a detection of a primary region becoming unresponsive or in response to a detection of an application not responding to client requests transmitted thereto. As another example, a user may provide input that selects a recovery plan or input that selects an RPG and a specific recovery operation, such as a switchover operation.

Regardless of how a recovery plan is triggered, a recovery service instance (e.g., 122) selects the recovery plan (e.g., from recovery plan database 128) and begins executing the steps in the recovery plan. A copy of a recovery plan for an RPG may reside in the standby region of the RPG and, optionally, in the primary region of the RPG. If a step involves taking down or deallocating a cloud resource in the primary region, then recovery service instance 122 may send, to its corresponding recovery service instance (e.g., instance 112) in the primary region, an instruction to take down that cloud resource. If a step involves bringing up or allocating a cloud resource in the standby region, the recovery service instance 122 performs that step.

In an embodiment, after a recovery operation (whether a switchover operation or failover operation) is performed with respect to an RPG given a recovery plan, the recovery service instance that performed (at least a portion of) the recovery operation automatically triggers generation of a new recovery plan for the cloud resources in the RPG. The new recovery plan is similar to the original recovery plan (e.g., same type of recovery operation), except that the cloud resources are in the old standby region (which is now the current primary region after the recovery operation completes). Thus, the cloud resources, in the current primary region, have locations that are different than the locations indicated for corresponding cloud resources in the original primary region. The new recovery plan may also be customized by the user, which customizations are preserved and reused when the new recovery plan is triggered at any point in the future. Additionally, the recovery service instance (e.g., 122) updates an RPG entry in RPG database 126 to indicate that (1) the old standby region is now the new primary region of the RPG and (2) the old primary region (or a different cloud region altogether) is now the new standby region of the RPG.

In an embodiment, recovery service instances 112 and 122 perform comprehensive logging that involves automatically creating log entries and storing the log entries in a log history file. Each log entry indicates an action that recovery service instances 112 and 122 performed (or initiated) and, optionally, a result of that action. In this way, a user viewing the log history file can see what actions were performed during execution of a recovery plan. If a recovery service instance failed to perform an action in a recovery plan, then the recovery service instance creates a log entry that indicates that action, that it failed, and, optionally, what error, if any, was detected and caused the failure.

In an embodiment, recovery service instances 112 and 122 perform credential management where credentials of an organization or user are stored in a secure location and recovery service instances 112 and 122 fetch or retrieve the appropriate credentials on-the-fly when performing various operations that require those credentials. For example, when stopping a primary database and activating a standby database, credentials may be required. Different cloud resources in a single RPG may require different credentials in order to perform operations relative to those cloud resources. Additionally or alternatively, different credentials may be required in order to perform different operations relative to the same cloud resource in a RPG. For example, stopping an application in a primary region may require first credentials while starting the application in a standby region may require second credentials that are different than the first credentials. Therefore, execution a single recovery plan may involve a recovery service instance retrieving different sets of credentials for different steps in the recovery plan.

In an embodiment, a recovery plan includes a DNS update step that involves causing a domain name service (DNS) entry at a DNS server to be updated to replace the IP address of an application end-point in the primary region with an IP address of the recovered application end-point in the standby region. The DNS update step may involve a recovery service instance sending a DNS update request that includes a domain name of the application and a new IP address that the DNS service will use to replace the previous or old IP address (i.e., of the application in the primary region).

Figure 6:
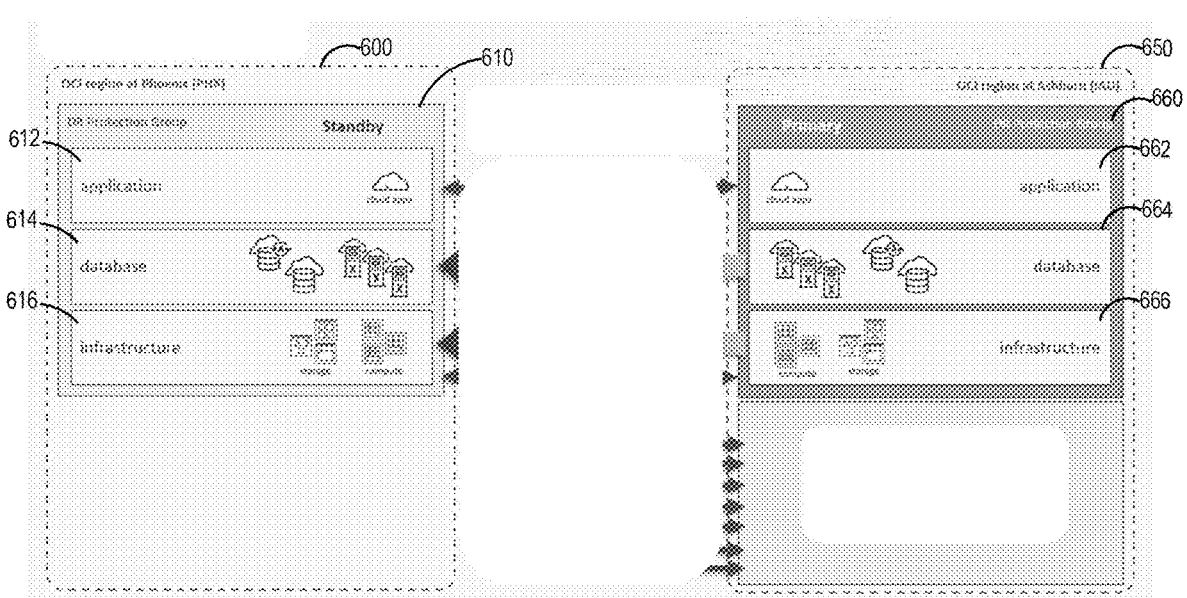
FIG. 6 is a block diagram that depicts results of executing a recovery plan, in an embodiment.

FIG. 6 is a block diagram that depicts results of executing a recovery plan, in an embodiment. FIG. 6 is similar to FIG. 2. After executing recovery plan 270 (which may be a switchover recovery plan), cloud region 600 becomes the standby region for RPG 660 and cloud region 650 becomes the primary region for RPG 660. RPG 610 corresponds to RPG 660. RPG 660 comprises application 662 (which corresponds to application 612), database resources 664 (which correspond to database resources 614), and infrastructure resources 666 (which correspond to infrastructure resources 616). The cloud resources in RPG 610 may be brought down or deallocated, such as application 612 and infrastructure resources 616, as part of continued execution of the recovery plan. However, a user might desire to retain cloud resources in the original primary region (cloud region 500) in preparation for a switchover (or switchback) in the near future.

Pre-Check

In an embodiment, a recovery plan includes a pre-check stage that involves one or more steps or actions that are performed before any cloud resources in an RPG are brought down or deallocated in a primary region or brought up or allocated in a standby region. The pre-check stage may be considered a preliminary stage before the main portion of the recovery plan is executed. The pre-check stage ensures that the cloud resources indicated in an RPG exist and are configured as expected. For example, if an RPG identifies four compute instances, then a pre-check (e.g., performed by recovery service instance 112) determines whether there are four compute instances. Since creation of the RPG, a customer may have added or removed compute instances. Therefore, performing a pre-check helps to identify any anomalies in a customer's topology, configuration, or application stack. "Topology" is a collective term for what resources are included in an application stack and how the application stack is structured.

Without a pre-check stage, a recovery plan that is executed and that is based on outdated information (such as an outdated configuration of a customer's application stack) will likely fail. However, before failure, there may have been numerous cloud resources in the primary region that are offline and/or cloud resources in the standby region that are not fully up and running, potentially resulting in a scenario where neither the application stack in the primary region nor the application stack in the standby region are operational. Furthermore, failing at this stage may require numerous manual steps to return the application stack in the primary region to an operational state and to remove/deallocate cloud resources in the standby region that were brought up during the recovery operation but before failure of the recovery operation.

In an embodiment, recovery plan generator 130 generates one or more pre-check steps and includes those steps in a recovery plan. Performing a pre-check step may involve selecting one or more actions in the recovery plan, identifying one or more characteristics of the cloud resource involved in each action, and verifying whether the cloud resource in the primary region matches those one or more characteristics. If a pre-check stage comprises multiple steps, then the steps run collectively. A result of the set of pre-check steps is a full list of anomalies that were detected in the topology for the recovery plan for which the pre-check was run. A user should then fix the anomalies (if any) and rerun the pre-check steps to ensure that no anomalies result.

An example of a relatively simple pre-check is a stop compute instance pre-check where executing the pre-check involves verifying that the compute instance exists, is running, and is part of the application stack configuration. An example of a relatively complex pre-check is a launch compute instance pre-check where executing the pre-check involves checking a number of dependencies, such as: is there a connection to an existing network; does the compute instance depend on a volume group; if so, is the volume group correctly replicated to the correct region; are all dependencies of the compute instance available in the standby region; are there any capacity constraints; is there an intention to use a specific capacity pool; is the capacity pool available; and, if so, does the pool have sufficient capacity to accommodate the launch of this compute instance.

Some actions of a pre-check cannot be performed at the very beginning of a recovery operation, i.e., before the main part of the recovery operation begins. Such actions may be performed later, during the recovery operation. Given a compute instance launch pre-check, while the disks to attach to the new compute instance do not exist yet in the standby region, the volume group from which those disks will be created does exist. Therefore, checking the existence of that volume group (in the primary region) can be done as part of the pre-check stage. Checking the existence of the replicated disks (from the volume group) can be performed later in the recovery operation, i.e., after the portion (of the recovery plan) that specifies creation of the replicated disks is executed. Thus, it may not be possible for execution of the pre-check stage to catch all possible issues that could arise during performance of a recovery operation.

In a related embodiment, a customer writes one or more pre-check steps that are customized to the customer's needs. For example, a customer might desire to execute a script that checks if a specific application component is running. The customer would do this in cases where the application is a custom application and, therefore, not natively handled by the cloud provider.

Regarding databases and switchovers, a pre-check might involve determining whether a database is in the proper state to perform a switchover operation. In fact, all resource types may have "acceptable" states in which a recovery operation can be triggered. For example, a database might need to be in an AVAILABLE state and its Data Guard replication would also need to be in an AVAILABLE state. Additionally, the replication lag might need to be below a certain threshold. All these things together comprise an "acceptable" state and the pre-check would then pass.

Failing a pre-check may involve displaying data or sending a message (e.g., to a customer) that the pre-check failed. The data/message may indicate what data was identified that was unexpected. If a pre-check of a recovery plan fails, then the remainder of the recovery plan is not executed. If the remainder of the recovery plan was to be executed despite failure of the pre-check of that recovery plan, then the recovery plan would eventually fail. However, because the remainder of the recovery plan is not executed, many computing resources and time to execute that remainder are not wasted.

In an embodiment, a pre-check is performed as a stand-alone operation periodically, such as daily, twice daily, or weekly. The pre-check may be from a recovery plan. If a failure occurs, then such a failure may indicate that the customer's topology changed (e.g., the customer may have added a database) or that the recovery plan changed (e.g., the customer may have changed the recovery plan manually). By performing a pre-check independently of a recovery operation, the pre-check may find these changes, potentially with sufficient time in advance of a needed recovery operation.

Drills

A drill is an operation that simulates a recovery operation without the corresponding application stack in the primary region being affected. Instead, during a drill operation, the application stack in the primary region continues functioning as if no recovery operation is happening. Thus, a drill operation brings up cloud resources, indicated in an RPG, in a standby region in isolation. For example, clones of application resources, compute resources, storage resources, and database resources are generated in a standby region and proper attachments among the clones are made in order to replicate the application stack in the standby region.

A drill (or drill operation) allows a customer to see a result of a recovery operation (e.g., a failover operation or a switchover operation) pertaining to the cloud resources in the customer's RPG. The result of a drill operation indicates a success or a failure. If there is a failure, then the drill brings that failure to light (before the recovery operation actually begins) and the customer and/or a representative of cloud system 100 can make changes to a recovery plan to make sure that the recovery plan is executed without a failure.

A drill also allows a customer and cloud system 100 to determine how long it might take to perform a recovery operation. By timing how long it takes to bring up cloud resources of the customer's RPG in a standby region, the customer can determine whether certain changes are needed in order to speed up the recovery operation (e.g., pre-allocating compute instances or storage) or to reduce cost (e.g., cease pre-allocating compute instances or storage) if recovery time is low enough.

A drill comprises two high-level stages: a start drill stage and a stop drill stage. Thus, a drill operation may be executed using two different drill plans: a start drill plan and a stop drill plan. During the start drill stage, a recovery service instance (e.g., instance 122) brings up (or allocates), in a standby region, cloud resources indicated in an RPG that is indicated as input in a drill operation.

A cloud resource, such as a database, may already be allocated in the standby region. However, the database may change its status such that the database operates differently as an active database instead of a standby database. For example, as a standby database, the database may receive and store redo logs. During a drill operation, when the database changes its status to an active database, the database applies the redo logs, and then the corresponding application (in the standby region) connects to the active database, which receives requests from the application, which application may have been brought up and activated as part of the start drill operation. For the standby database, a copy of the standby database may be made and the copy is the one whose status is changed to active status. In this way, the original standby database may continue to operate as a standby database so that it can still receive redo logs from a primary database in the primary region.

If no copy or clone of the standby database is made, then, after the start drill operation is complete, the active database is converted to a standby database by performing a flashback operation to a point in time right before the conversion from the standby database to the active database. Then the redo logs that have accumulated since that conversion may be applied to the standby database. The conversion back to a standby database may be performed as part of a stop drill operation, which is described in more detail herein.

Regarding storage cloud resources (such as block storage and file storage), a start drill operation may include a step to create, in the standby region, a clone from a replicated snapshot (that was already created in the standby region previous to the start drill operation) and then make the clone a read/write clone. Afterwards, the application connects to the clone and communicates with the clone.

After a start drill plan is fully executed, the cloud resources in an RPG are up and running in a standby region of the RPG. While the cloud resources are up and running, one or more tests may be performed relative to the cloud resources. For example, client requests that are received by the primary application in the primary region are shipped or transmitted to the corresponding standby application in the standby region and the standby application processes the client requests, which may involve calling one or more standby databases (that were brought up as part of the drill operation) and storing data to/retrieving data from standby block storage. One test may involve comparing results (of client requests) produced by the application stack in the primary region with results (of the same client requests) produced by the corresponding application stack in standby region. If the results do not match, then that may indicate that a future recovery operation will also result in incorrect results.

Another test may be comparing the time it takes for the standby application stack to process one or more client requests with the time it takes for the primary application stack to process the same one or more client requests. If the standby time is much slower (presuming the results produced by each application stack are the same), then that may mean something is wrong with the standby application stack and the problem may be identified, for example, by comparing execution times of each cloud resource in the standby application stack with corresponding execution times of each cloud resource in the primary application stack. One of the execution times may be the time for a cloud resource (e.g., the application) to perform a task internally and another of the execution times may be the time to communicate or transmit data from one cloud resource (e.g., the application) to another cloud resource (e.g., a database).

There are two main types of databases that may be included in an RPG: an autonomous shared database and a snapshot standby database. In a drill operation, in the context of an autonomous shared database, a clone is created and used in the drill operation for testing purposes. Because the clone is used in the drill operation, the autonomous shared database is immediately available in case a recovery operation is triggered during the drill operation.

On the other hand, during a drill operation for a snapshot standby database, the snapshot standby database is temporarily converted to a read/write database, which is tested during the drill operation. However, during the drill operation, the read/write database is not available for a failover or switchover. The read/write database needs to be converted back to a snapshot standby database and then the failover or switchover operation can commence.

FIG. 7A is a screenshot of an example start drill template 700, in an embodiment. Start drill template 700 includes four steps: a built-in pre-check step 710, a restore volume group step 712, a create clone of an autonomous database step 714, and a launch compute instance step 716 (which launches one or more compute instances in the standby region, and may involve attaching those compute instances to an application in the standby region). In this example, each of the steps is a built-in step.

After a start drill operation completes and zero or more tests are performed on the standby application stack, a stop drill operation is performed. Like a start drill operation, a stop drill operation comprises a number of steps or actions, except the steps involve deleting or deallocating or reverting one or more cloud resources that were added/allocated/converted as part of the start drill operation. For example, an application that was started in the standby region is stopped and deleted, a file storage that was allocated in the standby region is deallocated, and a standby database that was converted to an active database in the standby region is reverted to a standby database. Similar to switchover plan and a failover plan, a start drill plan and a stop drill plan indicate a particular order in which the steps of the plan are performed, which order is pre-determined by the corresponding plan template.

FIG. 7B is a screenshot of an example user interface (UI) 750 for presenting steps of a start drill plan, in an embodiment. UI 750 comprises three columns: a name column that indicates a name of a step in the start drill plan, a type column that indicates a type of that step (whether built-in or user defined), and an enabled/disabled column that indicates whether that step is enabled or disabled. User selection of a name of a step may cause one or more sub-steps of that step (and/or one or more details of the step) to be presented in UI 750. In this example, no steps in the start drill plan are disabled and four steps are user defined.

FIG. 8 is a screenshot of an example stop drill template 800, in an embodiment. Start drill template 800 includes seven steps: a built-in pre-check step 810, a stop compute instance step 812 (which stops the compute instance that was brought up in the standby region, which step effectively stops the application that runs on top of the compute instance), a remove compute instance step 814 (which removes the compute instance from the recovery group), and a terminate compute instance step 816 (which deletes or terminates the compute instance from the cloud), a delete autonomous database clone step 818, a remove volume group step 822, a terminate volume group step 824. In this example, each of the steps is a built-in step.

In an embodiment, a drill plan is automatically updated, similar to a recovery plan. Such updates may involve updating a particular action (e.g., where the action is converting a standby database to an active database) in response to detecting a change to a cloud resource associated with the particular action (e.g., where the change is adding another database instance to the standby database). The updating of the drill plan may involve adding database instance identification data to the database instance. Another example update is a new cloud resource being added to an RPG. In response to detecting this addition, the drill plan is updated to include an action that references the new cloud resource to ensure that a corresponding cloud resource is brought up in the standby region when the drill plan is executed.

Example Drill Process

Figure 9:
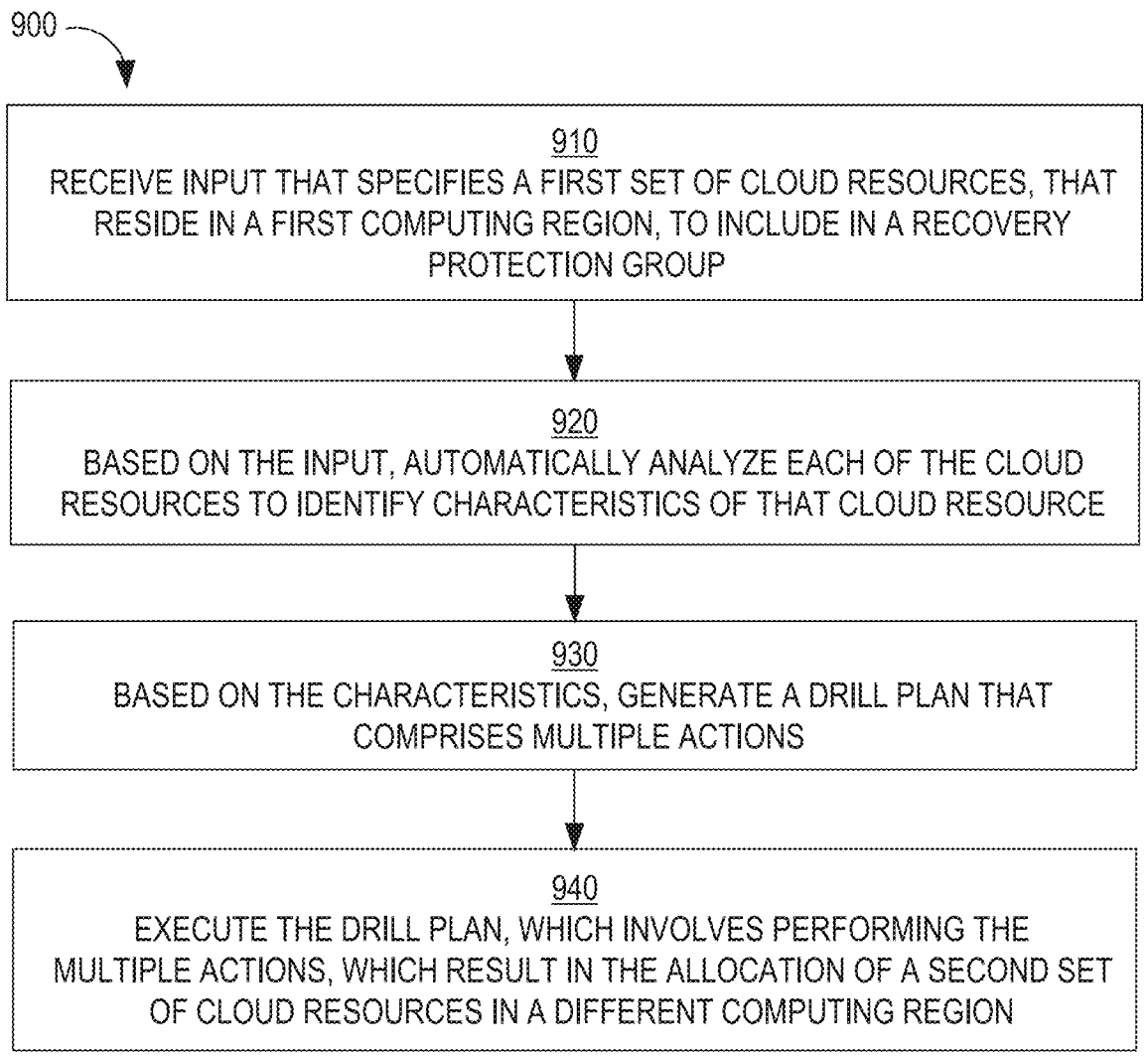
FIG. 9 is a flow diagram that depicts an example process for executing a drill operation, in an embodiment.

FIG. 9 is a flow diagram that depicts an example process 900 for executing a drill operation, in an embodiment. Process 900 may be performed by a recovery service instance (e.g., recovery service instance 122).

At block 910, input that specifies a first plurality of cloud resources, that reside in a first computing region, to include in a recovery protection group is received. The input may be specified in a graphical user interface (GUI) or in a command line interface (CLI) that is provided by cloud system 100. Alternatively, the recovery service instance automatically identifies one or more cloud resources in a customer's application stack based on input, from the customer, that indicates an intention to create an RPG.

At block 920, based on the input, each cloud resource of the first plurality of cloud resources is automatically analyzed to identify characteristics of the cloud resource. Block 920 may comprise the deep introspection described herein.

At block 930, based on the characteristics, a drill plan is automatically generated that comprises a plurality of actions for allocating a second plurality of cloud resources in a second computing region that is different than the first computing region. Block 930 may involve using a drill template to generate the drill plan. Block 930 may also involve generating two drill plans: a start drill plan and a stop drill plan.

At block 940, the (start) drill plan is executed. Block 940 involves performing the plurality of actions indicated in the drill plan, which involves allocating the second plurality of cloud resources that correspond to the first plurality of cloud resources. Block 940 may involve recording a time it takes to allocate each cloud resource in the second plurality of cloud resources.

Process 900 may also involve performing one or more tests of the second plurality of cloud resources, such as testing whether each cloud resource in the second plurality is executing and responsive and whether the standby application stack can accurately process client requests (whether actual or simulated) in a reasonable amount of time.

Process 900 may also involve, after performing any tests on the second plurality of cloud resources, performing a stop drill operation that stops the second plurality of cloud resources and deallocates those resources.

Estimating Recovery Time

Entities that seek to recover their cloud resources as a result of a recovery operation (e.g., failover or switchover) may desire to know how long it takes to perform that operation. Typically, cloud service providers give such entities a guaranteed time indicating that any migration will not take more than that guaranteed time. However, such upper limits tend to be advertised times that are not based on the number or complexity of the cloud resources that need to be recovered. For example, different applications may vary greatly, some comprising many components running on many compute instances while others comprise a single component that runs on only one or two compute instances. As another example, a compute instance with eight CPUs, thirty-two GBs of RAM, and four disks attached may take much longer to recover than a compute instance with two CPUs, eight GBs of RAM, and one disk attached.

In an embodiment, a time to recover a set of cloud resources indicated in an RPG of an entity is computed based on the number, type, and/or complexity of one or more cloud resources in the set. For example, the greater the number of databases and the number of instances of each database there are in a RPG, the greater the time to recover the databases. As another example, the greater the number of redo logs on a standby database, the greater the time to recover the database.

In a related embodiment, a time to recover in both failover and switchover scenarios are computed and provided to an entity. A switchover scenario may take longer to perform since a switchover involves taking/bringing down a set of cloud resources in the primary region in addition to bringing up a set of cloud resources in the standby region.

In an embodiment, an estimated time to recover an entity's set of cloud resources is computed based on historical data that is associated with that entity. An example of historical data is data that indicates a past recovery of the same set of cloud resources. For example, that past recovery may have been recovering the set of cloud resources from another region (e.g., a former primary region and current standby region) to the current region (which may be the current primary region). The past recovery may be of the same or different type of recovery as the type of recovery for which a time to recover is being computed. For example, the past recovery may have been a switchover while the type of recovery for which a time is being computed or estimated ("future recovery") is also a switchover. As another example, the past recovery is a switchover while the future recovery is a failover. In this example, the time to perform the second half of the past switchover operation (i.e., the portion of the past switchover operation involving bringing up cloud resources in a standby region) may be used to compute or estimate the future failover operation. As another example, the past recovery is a failover while the future recovery is a switchover. In this example, the time to perform the failover operation may be used as a factor in computing the future recovery.

If the number, type, and complexity of cloud resources involved in a past recovery are significantly different than the number, type, and complexity of cloud resources that would be involved in a future recovery, then weight given to the times involved in the past recovery may be small, if anything. However, to the extent that one or more cloud resources are the same or similar between the past and future recoveries, the times associated with recovery those one or more cloud resources may be used to compute or estimate a total time for the future recovery. For example, even though the number of databases and compute instances have increased since a past switchover operation, the time to bring down an application in the past switchover operation may be used as an estimate in a future switchover operation if the application is the same size (or the same number of components).

In a related embodiment, a time to recover for an entity's set of cloud resources is computed based on drill time data that indicates how long it took for a drill operation that involved similar cloud resources of the entity. For example, if it took thirty minutes to perform a drill operation, then it may be presumed that it might take about thirty minutes to perform a failover operation, especially if the cloud resources involved in the drill operation are the same type, number, and complexity as the cloud resources that would be involved in the future failover operation.

In an embodiment, historical data associated with a first entity may be used to estimate a recovery time of cloud resources of a second entity that is different than the first entity. For example, if the sizes of the respective applications, the type and number of databases, and/or the type and number of compute instances are similar (e.g., within certain thresholds), then the time to perform the past recovery may be used as an estimate to perform the future recovery.

In an embodiment, an auto-generated recovery plan for a future recovery is used to compute an estimated recovery time for the future recovery. The recovery plan comprises multiple steps. An estimated time to perform each step is computed and the estimated times are aggregated to generate a total estimated recovery time for the future recovery. For example, a failover operation may comprise twelve steps. A time to perform each step may be computed, whether based on historical data of the entity in question and/or based on historical data of another entity. Then the twelve estimated steps are totaled to compute a total estimated time to perform the failover operation. Thus, the estimated times of some of the plan's steps may be based on historical data of the entity in question and the estimated times of others of the plan's steps may be based on historical data of one or more other entities.

In an embodiment, a time to perform a past recovery step (e.g., indicated in historical data) is modified to compute an estimated time to perform the recovery step in the future. For example, if an RPG of an entity comprised two compute instances and it took N minutes to recover (e.g., failover) the two compute nodes, and now the RPG of the entity comprises four compute instances, then it may be estimated that the time to recover the four compute instances in the future will be 2*N minutes. As another example, if an RPG of an entity comprised a single database storing M terabytes and it took N minutes to recover (e.g., switchover) the database, and an RPG of another entity comprises a single database storing M/3 terabytes, then it may be estimated that the time to recover the database in the future will be N/3 minutes. The more that two cloud resources are similar, in number, type, and complexity, the more that the time to recover one cloud resource may be used to estimate the time to recover the other cloud resource. For example, even though two databases store the same amount of data, one database may be a single instance database while another database may be an eight-instance RAC database, which is (i) more complex to take down during the first stage of a switchover operation and (ii) more complex to bring up during the second stage of the switchover operation.

In an embodiment, the parallel nature of a set of recovery steps is considered when estimating a recovery time of the set of recovery steps. For example, (i) taking down a set of databases (during a switchover) may be performed at the same time that (ii) a set of compute instances are taken down. Thus, a first estimated time to perform (i) is computed and second estimated time to perform (ii) is computed. The estimated time that is shorter may be ignored when computing a total estimated time to recover a set of cloud resources that includes the set of databases and the set of compute instances.

Example Recovery Time Estimation Process

Figure 10:
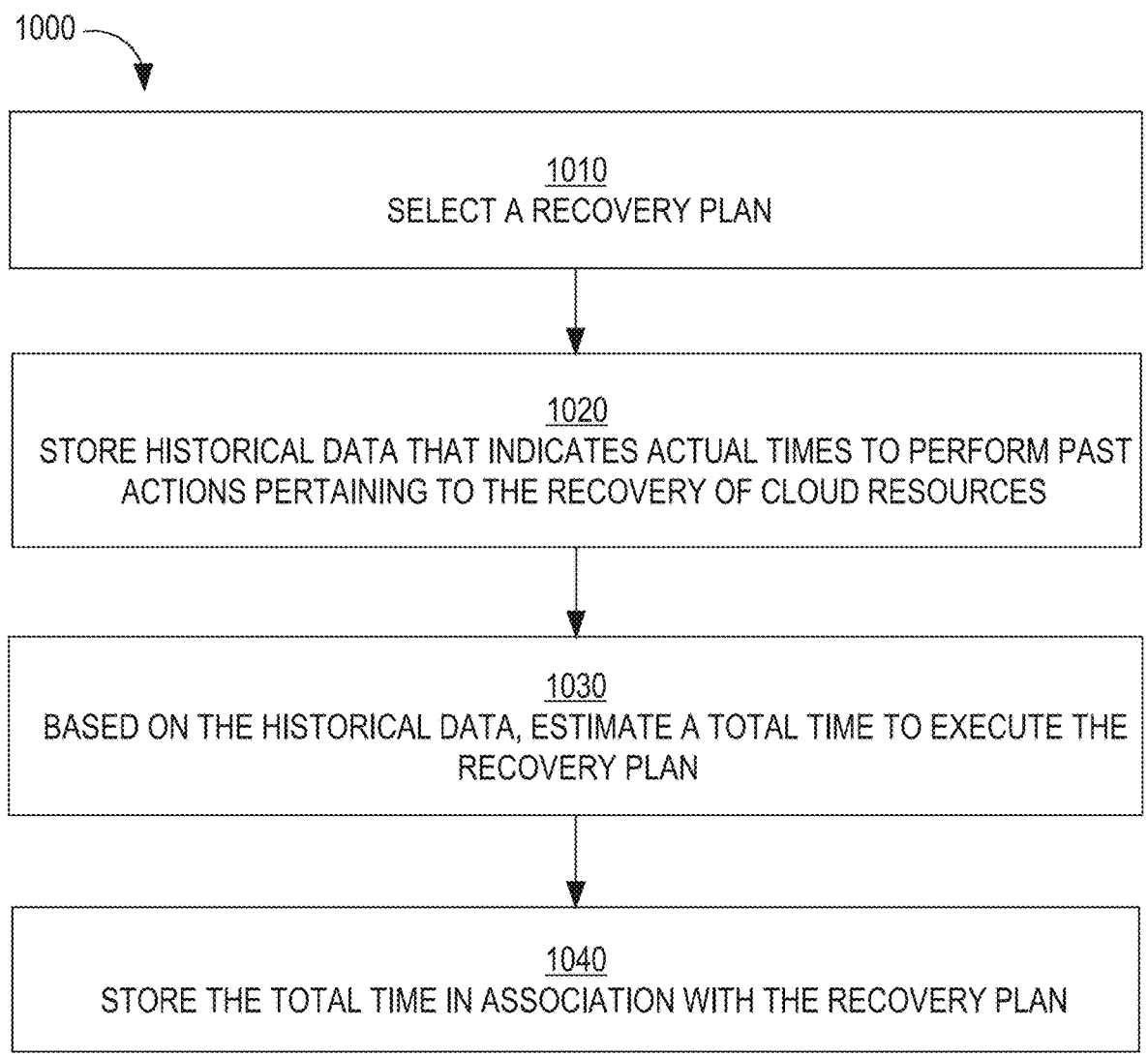
FIG. 10 is a flow diagram that depicts an example process for estimating a time to perform a recovery operation, in an embodiment.

FIG. 10 is a flow diagram that depicts an example process 1000 for estimating a time to perform a recovery operation, in an embodiment.

At block 1010, a recovery plan is selected that comprises multiple actions to perform relative to a plurality of cloud resources in a recovery protection group. Block 1010 may involve receiving, from a user, input that identifies or selects a recovery plan. The input may be received through a GUI or a CLI. If the user is associated with multiple recovery plans, one for each of multiple RPGs of the user, then the input may include recovery plan identification data that uniquely identifies the selected recovery plan from the other recovery plans.

At block 1020, historical data is stored that indicates actual times to perform past actions pertaining to recover cloud resources. Thus, process 1000 is preceded by the performance of one or more past recovery operations and/or one or more past drills, whether for the same user and/or for other users. The historical data may indicate a total time to perform each recovery operation or drill operation and/or times to perform individual steps in those past recovery/drill operations.

At block 1030, based on the historical data, a total time to execute the recovery plan is estimated. Block 1030 may involve using, as an estimate, the actual time of a past operation (e.g., a failover operation) that is similar to the operation of the recovery plan. Alternatively, block 1030 may involve identifying, in the historical data, multiple actual times of multiple past operations and computing an average or median of those actual times to use as an estimate. Alternatively, block 1030 may involve estimating, based on a portion of the historical data, a time for performing each action of the recovery plan and then aggregating those times to compute a total estimated time.

At block 1040, the total time is stored in association with the recovery plan. This total time may be retrieved by a user or customer that owns or manages the RPG that is the object of the recovery plan and used to make decisions regarding whether the estimated total time is sufficient and whether any changes to the user's application stack and/or standby resources should be updated to (i) decrease future recovery time or (ii) reduce cost of maintaining standby resources.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 11:
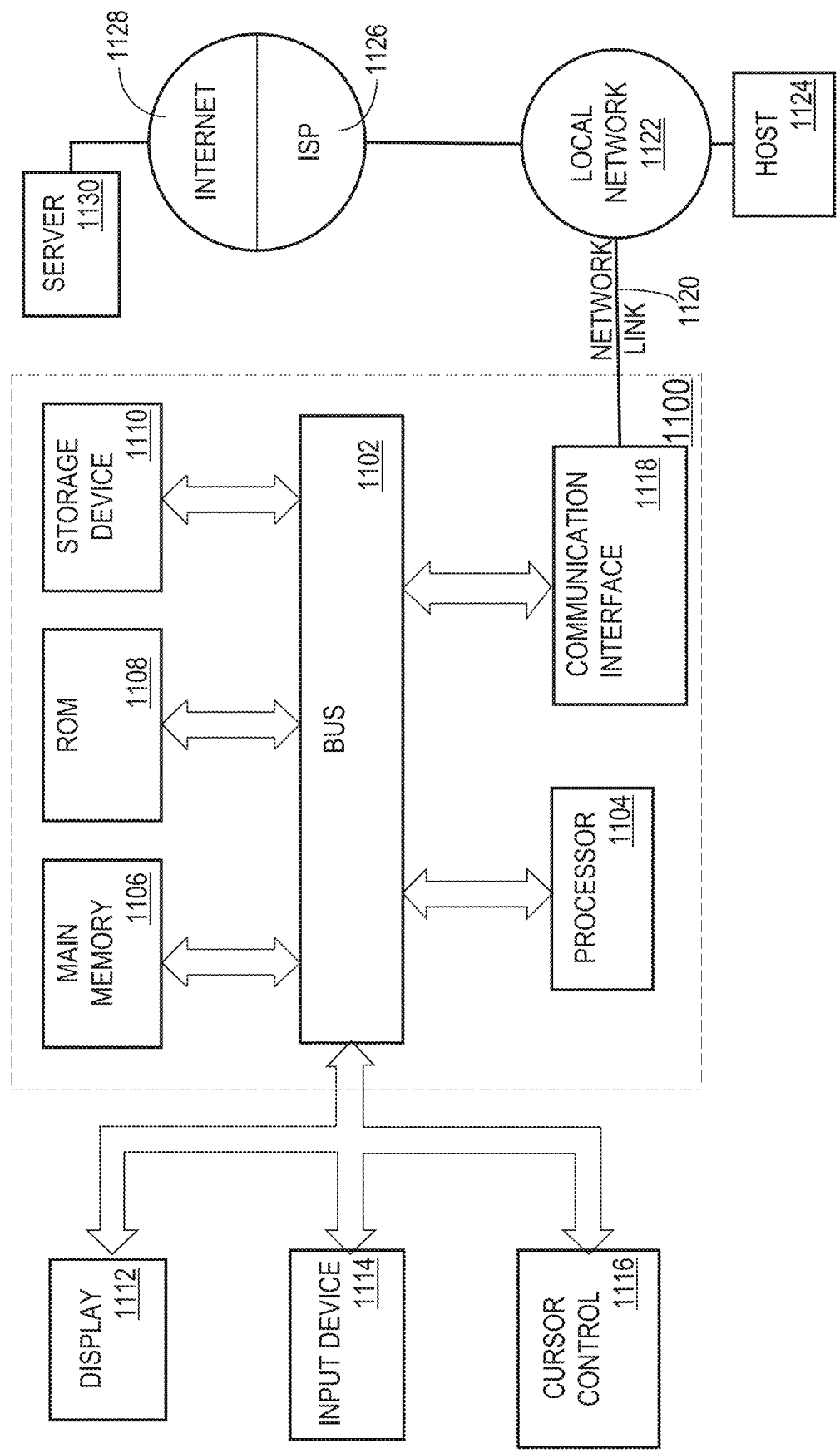
FIG. 11 is a block diagram that illustrates a computer system upon which an embodiment of the invention may be implemented.

For example, FIG. 11 is a block diagram that illustrates a computer system 1100 upon which an embodiment of the invention may be implemented. Computer system 1100 includes a bus 1102 or other communication mechanism for communicating information, and a hardware processor 1104 coupled with bus 1102 for processing information. Hardware processor 1104 may be, for example, a general purpose microprocessor.

Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Such instructions, when stored in non-transitory storage media accessible to processor 1104, render computer system 1100 into a special-purpose machine that is customized to perform the operations specified in the instructions.

Computer system 1100 further includes a read only memory (ROM) 1108 or other static storage device coupled to bus 1102 for storing static information and instructions for processor 1104. A storage device 1110, such as a magnetic disk, optical disk, or solid-state drive is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

Computer system 1100 may implement the techniques described herein using customized hard-wired logic, one or more ASICs or FPGAs, firmware and/or program logic which in combination with the computer system causes or programs computer system 1100 to be a special-purpose machine. According to one embodiment, the techniques herein are performed by computer system 1100 in response to processor 1104 executing one or more sequences of one or more instructions contained in main memory 1106. Such instructions may be read into main memory 1106 from another storage medium, such as storage device 1110. Execution of the sequences of instructions contained in main memory 1106 causes processor 1104 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1110. Volatile media includes dynamic memory, such as main memory 1106. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1102. Transmission media can also take the form of acoustic or light waves, such as those generated during radio-wave and infra-red data communications.

Various forms of media may be involved in carrying one or more sequences of one or more instructions to processor 1104 for execution. For example, the instructions may initially be carried on a magnetic disk or solid-state drive of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 1122. For example, communication interface 1118 may be an integrated services digital network (ISDN) card, cable modem, satellite modem, or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic, or optical signals that carry digital data streams representing various types of information.

Network link 1120 typically provides data communication through one or more networks to other data devices. For example, network link 1120 may provide a connection through local network 1122 to a host computer 1124 or to data equipment operated by an Internet Service Provider (ISP) 1126. ISP 1126 in turn provides data communication services through the worldwide packet data communication network now commonly referred to as the "Internet" 1128. Local network 1122 and Internet 1128 both use electrical, electromagnetic, or optical signals that carry digital data streams. The signals through the various networks and the signals on network link 1120 and through communication interface 1118, which carry the digital data to and from computer system 1100, are example forms of transmission media.

Computer system 1100 can send messages and receive data, including program code, through the network(s), network link 1120 and communication interface 1118. In the Internet example, a server 1130 might transmit a requested code for an application program through Internet 1128, ISP 1126, local network 1122 and communication interface 1118.

The received code may be executed by processor 1104 as it is received, and/or stored in storage device 1110, or other non-volatile storage for later execution.

Software Overview

Figure 12:
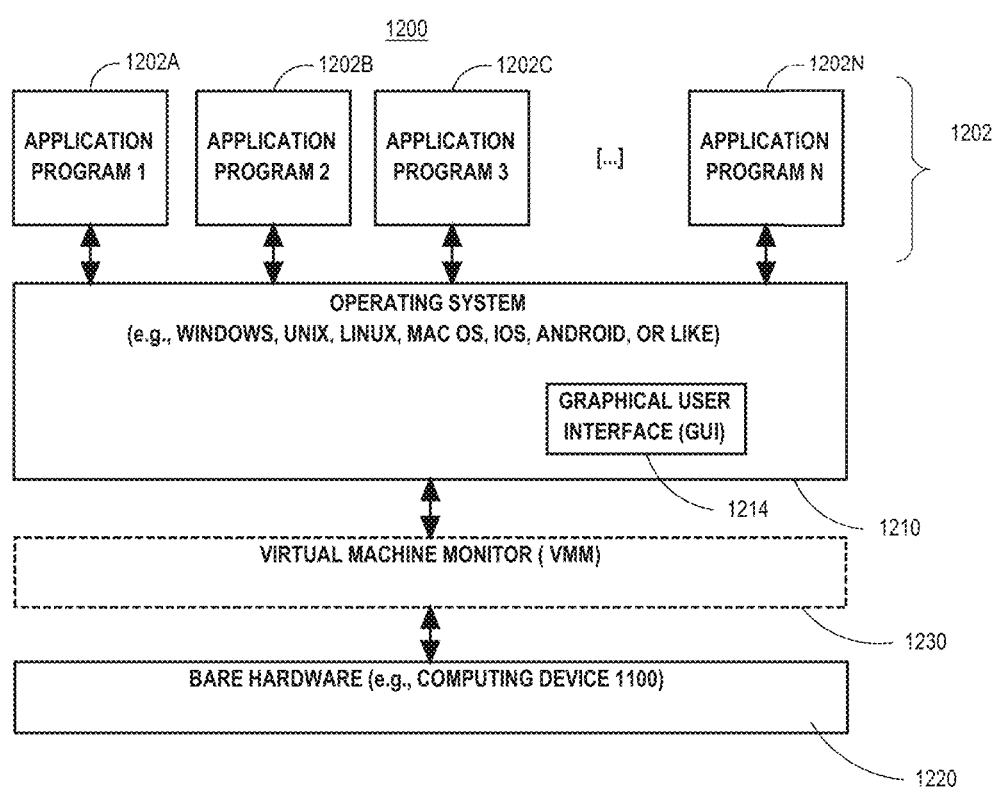
FIG. 12 is a block diagram of a basic software system that may be employed for controlling the operation of the computer system.

FIG. 12 is a block diagram of a basic software system 1200 that may be employed for controlling the operation of computer system 1100. Software system 1200 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 1200 is provided for directing the operation of computer system 1100. Software system 1200, which may be stored in system memory (RAM) 1106 and on fixed storage (e.g., hard disk or flash memory) 1110, includes a kernel or operating system (OS) 1210.

The OS 1210 manages low-level aspects of computer operation, including managing execution of processes, memory allocation, file input and output (I/O), and device I/O. One or more application programs, represented as 1202A, 1202B, 1202C . . . 1202N, may be "loaded" (e.g., transferred from fixed storage 1110 into memory 1106) for execution by the system 1200. The applications or other software intended for use on computer system 1100 may also be stored as a set of downloadable computer-executable instructions, for example, for downloading and installation from an Internet location (e.g., a Web server, an app store, or other online service).

Software system 1200 includes a graphical user interface (GUI) 1215, for receiving user commands and data in a graphical (e.g., "point-and-click" or "touch gesture") fashion. These inputs, in turn, may be acted upon by the system 1200 in accordance with instructions from operating system 1210 and/or application(s) 1202. The GUI 1215 also serves to display the results of operation from the OS 1210 and application(s) 1202, whereupon the user may supply additional inputs or terminate the session (e.g., log off).

OS 1210 can execute directly on the bare hardware 1220 (e.g., processor(s) 1104) of computer system 1100. Alternatively, a hypervisor or virtual machine monitor (VMM) 1230 may be interposed between the bare hardware 1220 and the OS 1210. In this configuration, VMM 1230 acts as a software "cushion" or virtualization layer between the OS 1210 and the bare hardware 1220 of the computer system 1100.

VMM 1230 instantiates and runs one or more virtual machine instances ("guest machines"). Each guest machine comprises a "guest" operating system, such as OS 1210, and one or more applications, such as application(s) 1202, designed to execute on the guest operating system. The VMM 1230 presents the guest operating systems with a virtual operating platform and manages the execution of the guest operating systems.

In some instances, the VMM 1230 may allow a guest operating system to run as if it is running on the bare hardware 1220 of computer system 1100 directly. In these instances, the same version of the guest operating system configured to execute on the bare hardware 1220 directly may also execute on VMM 1230 without modification or reconfiguration. In other words, VMM 1230 may provide full hardware and CPU virtualization to a guest operating system in some instances.

In other instances, a guest operating system may be specially designed or configured to execute on VMM 1230 for efficiency. In these instances, the guest operating system is "aware" that it executes on a virtual machine monitor. In other words, VMM 1230 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing a first recovery plan that comprises a first plurality of actions to perform relative to a first plurality of cloud resources in a first recovery protection group in a primary region;
   wherein executing the first recovery plan comprises performing the first plurality of actions in a standby region;
   wherein performing the first plurality of actions comprises:
      allocating, in the standby region, cloud resources that correspond to the first plurality of cloud resources;
      recording one or more times to perform one or more actions of the first plurality of actions;
   storing a second recovery plan that comprises a second plurality of actions to perform relative to a second plurality of cloud resources in a second recovery protection group, wherein the second plurality of cloud resources are cloud resources in an application stack of an entity and comprise two or more of database resources, compute resources, storage resources, or networking resources;
   storing historical data that indicates actual times to perform one or more actions pertaining to recovering a plurality of types of cloud resources, wherein the actual times include the one or more times;
   based on the historical data, estimating a total time to execute the second recovery plan;
   storing the total time in association with the second recovery plan;
   wherein the method is performed by one or more computing devices.

2. The method of claim 1, further comprising:
   for each action of the second plurality of actions of the second recovery plan, estimating, based on a portion of the historical data, a time to perform said each action;
   wherein estimating the total time is also based on the time to perform each action of the second plurality of actions of the second recovery plan.

3. The method of claim 1, wherein:
   the second recovery protection group is for a first entity;
   estimating the total time comprises estimating the total time based on one or more actual times pertaining to one or more cloud resources of a second entity that is different than the first entity.

4. The method of claim 1, wherein:
   the second recovery protection group is for a first entity;
   estimating the total time comprises estimating a total time based on one or more first actual times pertaining to one or more first cloud resources of the first entity.

5. The method of claim 4, wherein:
   estimating the total time also comprises estimating a second time for a particular action, of the second plurality of actions, based on one or more second actual times pertaining to one or more second cloud resources of a second entity that is different than the first entity;
   estimating the total time is also based on the second time.

6. The method of claim 1, wherein the second plurality of cloud resources include resource types that comprise an application type, a database type, and one or more a compute instance type or a storage type.

7. The method of claim 1, further comprising:
   identifying one or more characteristics of a particular cloud resource, of the second plurality of cloud resources, that is associated with a particular action of the second plurality of actions;

wherein estimating a particular time for the particular action comprises estimating the particular time based on the one or more characteristics of the particular cloud resource.

8. The method of claim 7, wherein:
one or more characteristics of an application type of cloud resource include a number of components of the application or a type of application;
one or more characteristics of a database type of cloud resource include a type of database or a size of the database;
one or more characteristics of a compute instance type of cloud resource include a number of compute instances or a number of processors of each compute instance;
one or more characteristics of a storage type cloud resource include a type of storage and a size of the storage.

9. The method of claim 1, wherein estimating the time to perform each action of the one or more actions comprises:
identifying, in the historical data, a particular time to perform a first action of the one or more actions;
determining that the first action is the same type of action as a particular action in the second plurality of actions;
determining a first size of a first resource that is associated with the first action;
determining a second size of a second resource that is associated with the particular action;
estimating the time to perform the particular action based on the particular time and a difference between the first size and the second size.

10. The method of claim 1, further comprising:
determining that two or more actions of the second plurality of actions may be performed in parallel with each other;
in response to determining that the two or more actions of the second plurality of actions may be performed in parallel with each other, determining to update the total time based on a first time that is associated with one of the two or more actions and not based on a second time that is associated with the other of the two or more actions.

11. One or more non-transitory storage media storing instructions which, when executed by one or more computing devices, cause:
executing a first recovery plan that comprises a first plurality of actions to perform relative to a first plurality of cloud resources in a first recovery protection group in a primary region;
wherein executing the first recovery plan comprises performing the first plurality of actions in a standby region;
wherein performing the first plurality of actions comprises:
allocating, in the standby region, cloud resources that correspond to the first plurality of cloud resources;
recording one or more times to perform one or more actions of the first plurality of actions;
storing a second recovery plan that comprises a second plurality of actions to perform relative to a second plurality of cloud resources in a second recovery protection group, wherein the second plurality of cloud resources are cloud resources in an application stack of an entity and comprise two or more of database resources, compute resources, storage resources, or networking resources;
storing historical data that indicates actual times to perform one or more actions pertaining to recovering a plurality of types of cloud resources, wherein the actual times include the one or more times;
based on the historical data, estimating a total time to execute the second recovery plan;
storing the total time in association with the second recovery plan.

12. The one or more non-transitory storage media of claim 11,
wherein the instructions, when executed by the one or more computing devices, further cause:
for each action of the second plurality of actions of the second recovery plan, estimating, based on a portion of the historical data, a time to perform said each action;
wherein estimating the total time is also based on the time to perform each action of the second plurality of actions of the second recovery plan.

13. The one or more non-transitory storage media of claim 11,
wherein:
the second recovery protection group is for a first entity;
estimating the total time comprises estimating the total time based on one or more actual times pertaining to one or more cloud resources of a second entity that is different than the first entity.

14. The one or more non-transitory storage media of claim 11,
wherein:
the second recovery protection group is for a first entity;
estimating the total time comprises estimating a total time based on one or more first actual times pertaining to one or more first cloud resources of the first entity.

15. The one or more non-transitory storage media of claim 14,
wherein:
estimating the total time also comprises estimating a second time for a particular action, of the second plurality of actions, based on one or more second actual times pertaining to one or more second cloud resources of a second entity that is different than the first entity;
estimating the total time is also based on the second time.

16. The one or more non-transitory storage media of claim 11,
wherein the second plurality of cloud resources include resource types that comprise an application type, a database type, and one or more a compute instance type or a storage type.

17. The one or more non-transitory storage media of claim 11,
wherein the instructions, when executed by the one or more computing devices, further cause:
identifying one or more characteristics of a particular cloud resource, of the second plurality of cloud resources, that is associated with a particular action of the second plurality of actions;
wherein estimating a particular time for the particular action comprises estimating the particular time based on the one or more characteristics of the particular cloud resource.

18. The one or more non-transitory storage media of claim 17, wherein:
one or more characteristics of an application type of cloud resource include a number of components of the application or a type of application;
one or more characteristics of a database type of cloud resource include a type of database or a size of the database;

one or more characteristics of a compute instance type of cloud resource include a number of compute instances or a number of processors of each compute instance;

one or more characteristics of a storage type cloud resource include a type of storage and a size of the storage.

19. The one or more non-transitory storage media of claim 11,
wherein estimating the time to perform each action of the one or more actions comprises:
identifying, in the historical data, a particular time to perform a first action of the one or more actions;
determining that the first action is the same type of action as a particular action in the plurality of actions;
determining a first size of a first resource that is associated with the first action;
determining a second size of a second resource that is associated with the particular action;
estimating the time to perform the particular action based on the particular time and a difference between the first size and the second size.

20. The one or more non-transitory storage media of claim 11,
wherein the instructions, when executed by the one or more computing devices, further cause:
determining that two or more actions of the second plurality of actions may be performed in parallel with each other;
in response to determining that the two or more actions of the second plurality of actions may be performed in parallel with each other, determining to update the total time based on a first time that is associated with one of the two or more actions and not based on a second time that is associated with the other of the two or more actions.

* * * * *